(12) United States Patent
Topolewski et al.

(10) Patent No.: US 8,419,441 B1
(45) Date of Patent: Apr. 16, 2013

(54) SYSTEM FOR ELECTRICALLY CONNECTING A PAIR OF CIRCUIT BOARDS USING A PAIR OF BOARD CONNECTORS AND AN INTERCONNECTOR RECEIVED IN APERTURES OF THE CIRCUIT BOARDS

(75) Inventors: John N. Topolewski, Westland, MI (US); Richard J. Hampo, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/301,833

(22) Filed: Nov. 22, 2011

(51) Int. Cl.
*H01R 12/00* (2006.01)

(52) U.S. Cl.
USPC .......................................................... 439/65

(58) Field of Classification Search ............... 439/65, 439/66, 79, 631, 638
See application file for complete search history.

(56) References Cited

U.S. PATENT DOCUMENTS

| | | | |
|---|---|---|---|
| 4,317,608 A | 3/1982 | Dechelette | |
| 4,527,857 A | 7/1985 | Hughes et al. | |
| 4,686,607 A * | 8/1987 | Johnson | 361/788 |
| 5,176,526 A | 1/1993 | Hillbish et al. | |
| 5,707,242 A | 1/1998 | Mitra et al. | |
| 6,223,973 B1 | 5/2001 | Wong et al. | |
| 6,695,622 B2 * | 2/2004 | Korsunsky et al. | 439/65 |
| 7,175,488 B2 | 2/2007 | Pavlovic et al. | |
| 7,413,476 B2 | 8/2008 | Ma | |
| 7,425,137 B1 * | 9/2008 | Sipe et al. | 439/74 |
| 7,445,467 B1 * | 11/2008 | Matsuo | 439/74 |
| 7,503,773 B2 | 3/2009 | Tokunaga | |
| 7,544,104 B2 | 6/2009 | Fan et al. | |
| 7,892,050 B2 | 2/2011 | Pavlovic et al. | |
| 2005/0136710 A1 | 6/2005 | Adell | |
| 2010/0197163 A1 | 8/2010 | Ofenloch et al. | |

\* cited by examiner

*Primary Examiner* — Chandrika Prasad
(74) *Attorney, Agent, or Firm* — Brooks Kushman P.C.

(57) ABSTRACT

A system for electrically connecting circuit boards includes a pair of board connectors configured to be electrically connected to respective circuit boards. Each of the board connectors includes a plurality of electrical conductors and a housing configured to enclose at least a portion of the electrical conductors. An interconnector includes a plurality of electrical conductors, each of which is configured to be electrically connected to a respective electrical conductor of the board connectors, thereby electrically connecting the circuit boards. An interconnector housing is configured to cooperate with the housings of the board conductors to at least partially enclose the electrical connections between the electrical conductors of the interconnector and the board connectors.

12 Claims, 4 Drawing Sheets

SYSTEM FOR ELECTRICALLY CONNECTING A PAIR OF CIRCUIT BOARDS USING A PAIR OF BOARD CONNECTORS AND AN INTERCONNECTOR RECEIVED IN APERTURES OF THE CIRCUIT BOARDS

TECHNICAL FIELD

The present invention relates to a system and method for electrically connecting circuit boards.

BACKGROUND

As electrical, electro-mechanical and electronic systems become more complex, the associated electronic circuitry may likewise increase in complexity. Moreover, packaging considerations may limit the space available for circuit boards and other electronic components. Thus, in some designs, it may be necessary to provide electronic circuitry on more than one circuit board. This may be dictated by, for example, the complexity of the design, or because a pair of smaller circuit boards working together fit better in the available package space. Soldering individual components onto circuit boards has become a largely automated process; however, electrically connecting two circuit boards to each other may still require hand soldering. Therefore, it would be desirable to provide a system and method for electrically connecting circuit boards that did not require soldering the circuit boards to each other.

SUMMARY

Embodiments of the present invention include a system for electrically connecting circuit boards. The system includes a pair of board connectors configured to be electrically connected to respective circuit boards. Each of the board connectors includes a plurality of electrical conductors and a housing configured to enclose at least a portion of the electrical conductors. An interconnector includes a plurality of electrical conductors, each of which is configured to electrically connect to a respective electrical conductor of the board connectors, thereby electrically connecting the circuit boards. An interconnector housing is configured to cooperate with the housings of the board connectors to at least partially enclose the electrical connections between the electrical conductors of the interconnector and the board connectors.

Embodiments of the present invention also include a system for electrically connecting circuit boards, which includes a first board connector configured to be soldered to a first circuit board using an automated soldering process. The first board connector includes a first housing and a plurality of electrical terminals disposed at least partially within the first housing. A second board connector is configured to be soldered to a second circuit board using an automated soldering process and includes a second housing and a plurality of electrical terminals disposed at least partially within the second housing. An interconnector includes a plurality of interconnector electrical terminals configured to electrically connect corresponding electrical terminals of the first and second board connectors with a non-soldered connection to electrically connect the first and second circuit boards.

Embodiments of the present invention further include a method for electrically connecting circuit boards, including the steps of soldering a first board connector to a first circuit board, soldering a second board connector to a second circuit board, and electrically connecting the first and second board connectors with a non-soldered connection such that the first and second circuit boards are electrically connected.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
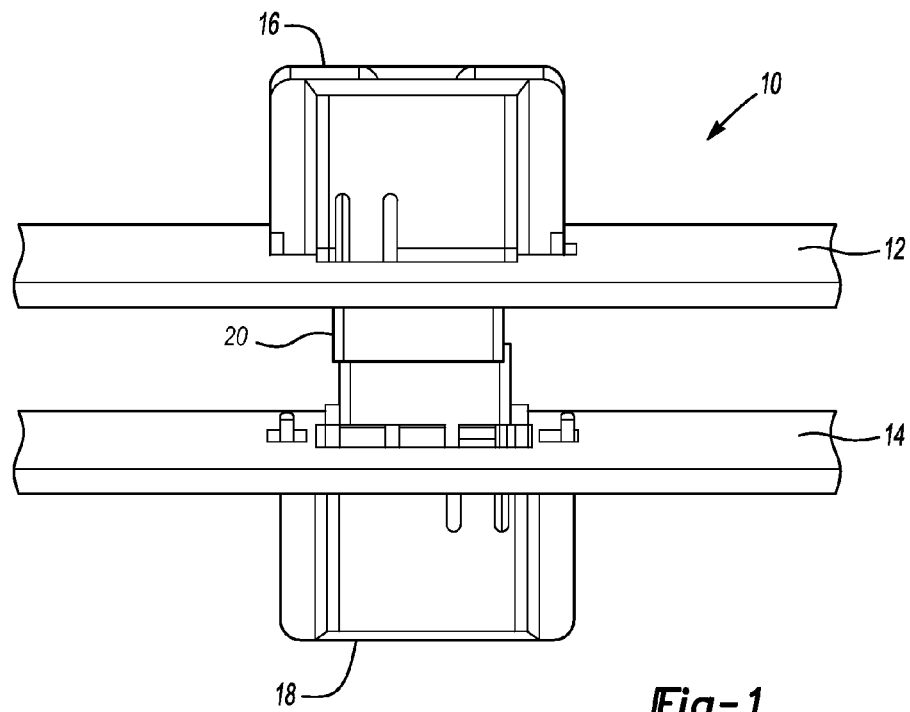
FIG. 1 is a perspective view of a system in accordance with embodiments of the present invention.
Figure 2:
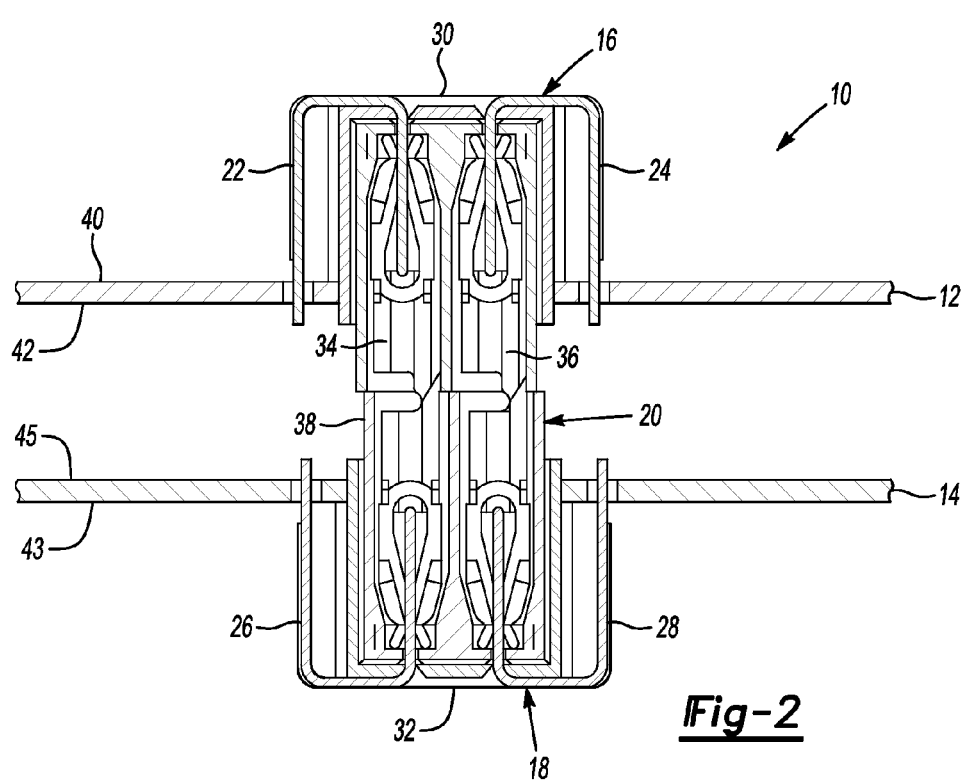
FIG. 2 is a cross-sectional view of the system shown in FIG. 1.

FIG. 1 shows a system 10 for electrically connecting circuit boards 12, 14 in accordance with embodiments of the present invention. The system 10 includes a pair of board connectors, shown as a first board connector 16 and a second board connector 18. The system 10 also includes an interconnector 20, which, along with the board connectors 16, 18, electrically connects first and second printed circuit boards (PCB's) 12, 14. FIG. 2 shows a cross-sectional view of the system 10 and circuit boards 12, 14. The first board connector 16 includes a pair of electrical conductors 22, 24; similarly, the second board connector 18 includes electrical conductors 26, 28. Each of the board connectors 16, 18 also includes respective housings 30, 32, which enclose at least a portion of their respective electrical conductors 22, 24 and 26, 28.

The interconnector 20 also includes a pair of electrical conductors 34, 36, disposed within the housing 38. As shown in FIG. 2, the interconnector housing 38 cooperates with the first and second housings 30, 32 of the first and second board connectors 16, 18 to enclose the electrical connections between the electrical conductors 22, 24, 26, 28 of the board connectors 16, 18 and the electrical conductors 34, 36 of the interconnector 20. In the embodiment shown in FIGS. 1 and 2, the electrical connections are completely enclosed by the respective housings 30, 32, 38; however, in some embodiments, the housings may not completely enclose the electrical connections—e.g., the housings may have one or more openings to provide heat dissipation or as a result of a molding process used to manufacture the housings.

As explained in more detail below, the board connectors 16, 18 cooperate with the interconnector 20 to provide an electrical connection between the PCB's 12, 14. As shown in FIG. 2, the first board connector 30 is mounted from a first or top side 40 of the PCB 12, while the interconnector 20 connects to the board connector 30 from a second or bottom side 42 of the PCB 12. Similarly, the second board connector 32 is mounted to the second PCB 14 from a first or top side 43 of the PCB 14, while the interconnector 20 connects to the second board connector 32 from a second or bottom side 45 of the PCB 14. Even though the orientation of the illustration in FIG. 2 shows the top side 43 as being below the bottom side 45 of the PCB 14, the respective top sides 40, 43 of the PCB's 12, 14 are those sides on which the electrical components are placed. For example, some electrical components may be mounted to the top sides 40, 43 using surface mount technology (SMT) or, as in the case of the board connectors 30, 32, may be inserted into the respective PCB's 12, 14 from the top sides 40, 43, while being soldered from below—i.e., from the bottom sides 42, 45.

As explained in more detail below, the configuration described above allows the board connectors 16, 18 to be soldered to their respective PCB's 12, 14 using an automated soldering process such as wave soldering or pin-in-paste soldering. As used herein, "an automated soldering process" is one that is generally performed by robotic or other automated equipment, and although some human intervention may be necessary—e.g., placement or adjustment of electrical components—the soldering is not done by hand. Moreover, an electrical component may be considered to be "configured" to be soldered by an automated soldering process, if, for example, all of its elements on one side of a corresponding PCB can be soldered or masked so that the component can be wave soldered. Another consideration for an electrical component to be "configured" for an automated soldering process is whether the component can withstand high temperatures that may be encountered, for example, during a reflow process such as pin-in-paste soldering. Thus, geometry, material properties, or some combination of these parameters can be evaluated to determine if an electrical component is "configured" to be soldered by an automated soldering process. Because embodiments of the present invention contemplate the use of board connectors, such as the board connectors 16, 18, which can be soldered to PCB's using an automated process, production assembly can be fast and efficient.

Figure 3:
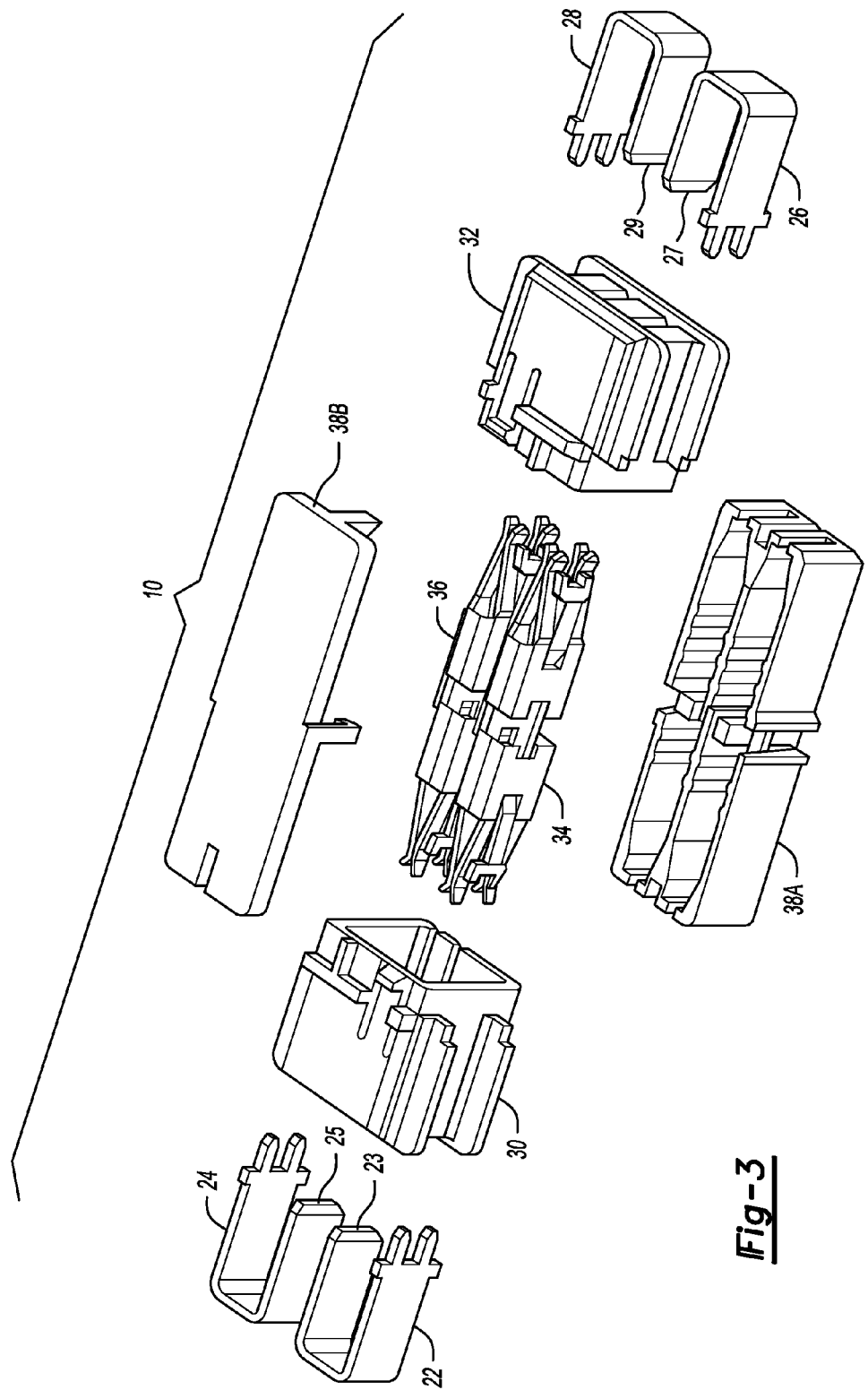
FIG. 3 is an exploded view of the system shown in FIG. 1.

FIG. 3 shows an exploded view of the system 10, including blade terminals 23, 25, which are a part of electrical conductors 22, 24, and blade terminals 27, 29, which are a part of electrical conductors 26, 28. The electrical conductors 34, 36 of the interconnector 20 are configured in this embodiment as female terminals, which are described in more detail below in conjunction with FIG. 7. Each of the female terminals of the electrical conductors 34, 36 are configured to cooperate with a respective one of the blade terminals 23, 25, 27, 29 to provide a non-soldered connection between the interconnector 20 and the board connectors 16, 18. Also shown in FIG. 3 is the housing 38 of the interconnector 20 as a two-piece assembly 38A, 38B; the interaction of the electrical conductors 34, 36 of the interconnector 20 with the interconnector housing 38 is described in more detail below in conjunction with FIG. 6.

Figure 4:
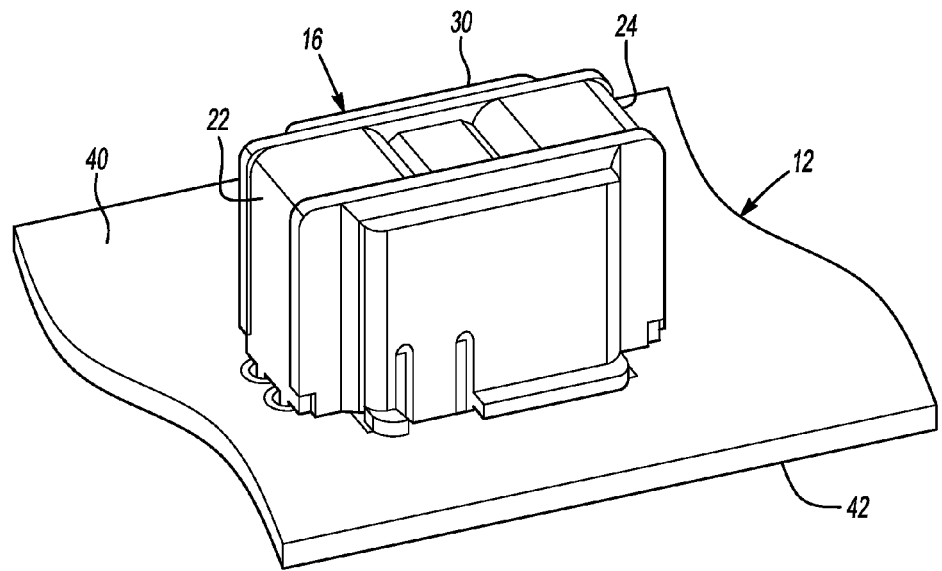
FIG. 4 is a fragmentary perspective view of a board connector from the system shown in FIG. 1.
Figure 5:
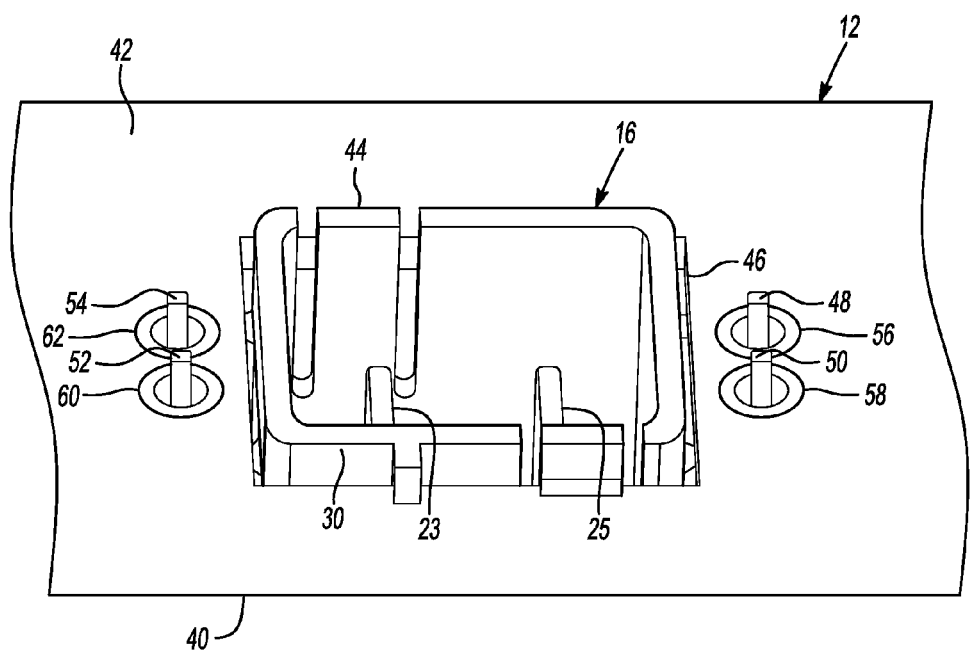
FIG. 5 is a fragmentary perspective view of the bottom side of the board connector shown in FIG. 4.

As shown in FIG. 4, the board connector 16 is mounted from and generally sits on the top side 40 of the PCB 12; the same is true for the second board connector 18 with regard to the second PCB 14. FIG. 5 shows a bottom side 42 of the PCB 12. In this view, it is readily seen that the housing 30 includes an open end 44 which is disposed proximate to and cooperates with an aperture 46 in the PCB 12. It is understood that the housing 32 of the second board connector 18 cooperates with a similar aperture in the PCB 14. As shown in FIG. 4, blade terminals 23, 25 do not extend out of the open end 44 of the housing 30. In this configuration, the interconnector 20 is disposed through apertures, such as the aperture 46, in each of the PCB's it is connecting. This helps to ensure that the housings 30, 32 of the board connectors 16, 18, and the interconnector housing 38, overlap each other and adequately enclose the electrical connections. This may be particularly important when the PCB's are part of a high-voltage circuit.

In addition to the blade terminals 23, 25, the electrical conductors 22, 24 of the first board connector 16 include a number of pins 48, 50, 52, 54, which are disposed in, and in this embodiment also extend through, corresponding apertures 56, 58, 60, 62 in the PCB 12. As shown in FIG. 5, each of the apertures 56-62 is surrounded by a trace, which is part of an electrical circuit imprinted on the PCB 12. With reference to FIGS. 3 and 4, it is apparent that the pins 48, 50 are part of the electrical conductor 24, while the pins 52, 54 are part of the electrical conductor 22. With this configuration, it is possible to electrically connect the electrical conductors 22, 24 of the board connector 16 to the PCB 12 using an automated soldering technique as applied to the bottom side 42 of the PCB 12. The same configuration and automated soldering process can be used to electrically connect the board connector 18 to the PCB 14.

Figure 6:
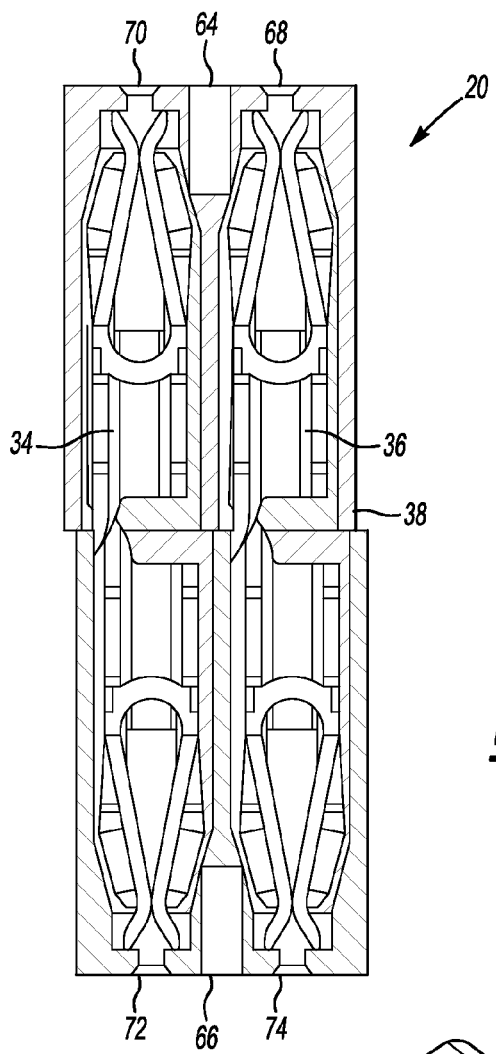
FIG. 6 is a cross-sectional view of an interconnector from the system shown in FIG. 1.

Because the system 10 includes an interconnector, such as the interconnector 20, to connect the board connectors 16, 18 with a non-soldered connection, the process of assembling PCB's, such as the circuit boards 12, 14, can be performed quickly and cost-effectively. This is in contrast to other systems, which may require hand soldering of electrical conductors to complete an electrical connection between two PCB's. FIG. 6 shows a cross-sectional view of the interconnector 20. The interconnector housing 38 includes two ends 64, 66. It is apparent from the figure that the ends 64, 66 are not completely "open", such as in the case of the open end 44 of the board connector housing 30 shown in FIG. 5. Rather, the end 64 of the interconnector housing 38 is referred to as "open" because of openings 68, 70, which are disposed adjacent the ends of electrical conductors 36, 34.

Similarly, the open end 66 includes two openings 72, 74 adjacent the other ends of electrical conductors 34, 36. The openings 68, 70 are configured to receive blade terminals, such as the blade terminals 25, 23 of the electrical conductors 24, 22 of the first board connector 16. The openings 72, 74 are configured to receive blade terminals 27, 29 of the second board connector 18. In this way, the electrical terminals 22, 24, 26, 28 of the first and second board connectors 16, 18 are configured to be slidably connected to the electrical terminals 34, 36 of the interconnector 20 to complete a non-soldered connection. The male and female terminals can be reversed, such that blade terminals are disposed within an interconnector, and female terminals are disposed within the board connectors. Moreover, other types of non-soldered connections between board connectors and an interconnector can also be used.

Figure 7:
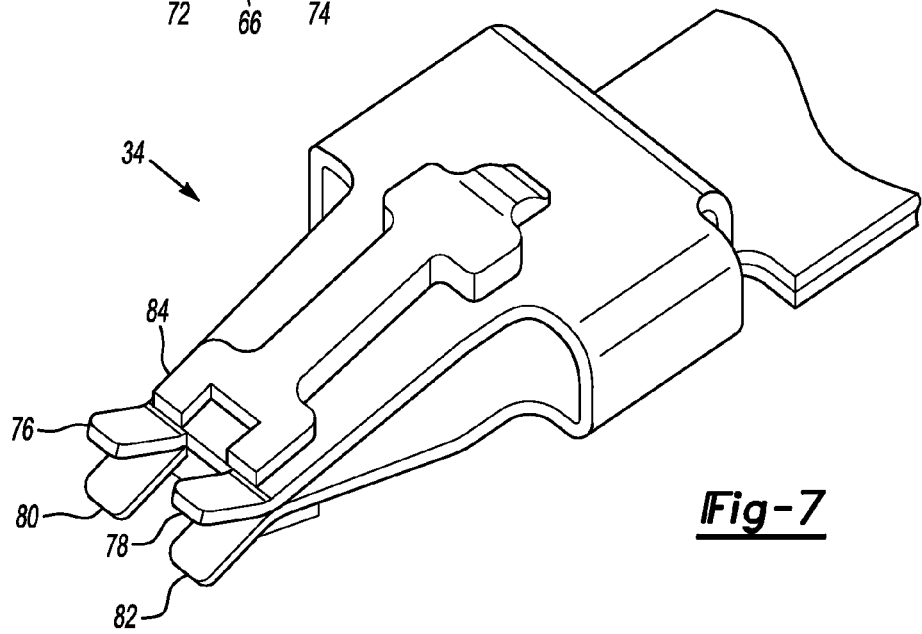
FIG. 7 is a fragmentary view of a female terminal from the interconnector shown in FIG. 6.

FIG. 7 shows a fragmentary view of a portion of the electrical conductor 34. In particular, it shows that the end of electrical conductor 34 is configured as a female electrical terminal having terminal legs 76, 78, 80, 82. In addition to the terminal legs 76-82, the end of the electrical conductor 34 includes a clamp member 84, which is arranged to apply the compressive force on the terminal legs 76-82 to secure a respective blade terminal therebetween. This configuration for a female electrical terminal provides the advantage of allowing the system 10 to be used in high-voltage applications. For example, a clamp member, such as the clamp member 84, may be made from a material having low relaxation properties at elevated temperatures, for example, 301 stainless steel. This allows the legs 76-82, which will be in direct electrical contact with a blade terminal, to be made from a highly conductive material, such as C151 copper. Without the use of the clamp member 84, higher temperature applications—such as high power applications where more than 70 amperes of current may be present—may require the legs 76-82 to be made from a copper alloy having better mechanical properties at higher temperatures, but poorer conductivity than the more pure copper material.

Use of systems in accordance with embodiments of the present invention, such as the system 10, described in detail above, facilitate an efficient and cost-effective method for electrically connecting circuit boards. With reference to the system 10 illustrated and described above, embodiments of the present invention include the steps of soldering the first board connector 16 to the first PCB 12, and soldering the second board connector 18 to the second PCB 14. As noted above, the soldering technique may conveniently be a wave or pin-in-paste soldering process, or it can be some other soldering process effective to achieve the desired result. The step of electrically connecting the first and second board connectors 16, 18 to each other will electrically connect PCB's 12, 14, and may be accomplished, for example, using an interconnector such as the interconnector 20.

Embodiments of the present invention further include the steps of mounting the board connectors 16, 18 to respective top sides 40, 43 of PCB's 12, 14, and connecting the first and second board connectors 16, 18 to each other with the interconnector 20 from respective bottom sides 42, 45 of the PCB's 12, 14. In at least some embodiments, one end 64 of the interconnector 20 is disposed through an aperture in the PCB 12 and into the housing 30 of the first board connector 16. Similarly, another end 66 of the interconnector 20 is disposed through an aperture in the PCB 14 and into the housing 32 of the second board connector 18. As described in detail above, the connection between the board connectors 16, 18 and the interconnector 20 can be made by a non-soldered connection, which, in at least some embodiments, can be made by sliding blade terminals from the board connectors 16, 18 into female electrical terminals in the interconnector 20. Using a non-soldered connection, such as described above can reduce the complexity and cost of electrically connecting and assembling circuit boards.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for electrically connecting circuit boards, comprising:
a pair of board connectors configured to be electrically connected to respective circuit boards, each of the board connectors including a plurality of electrical conductors and a housing configured to enclose at least a portion of the electrical conductors; and
an interconnector including a plurality of electrical conductors, each configured to electrically connect to a respective electrical conductor of the board connectors, thereby electrically connecting the circuit boards, and a housing configured to cooperate with the housings of the board conductors to at least partially enclose the electrical connections between the electrical conductors of the interconnector and board connectors, and wherein the housing of each board connector includes an open end configured to cooperate with an aperture in a respective circuit board such that respective portions of the interconnector are disposed through corresponding apertures in each circuit board and into the open ends of respective board connectors when the interconnector is electrically connected to the board connectors.

2. The system of claim 1, wherein each of the board connectors is configured to be mounted to a first side of a respective circuit board, and the interconnector electrically connects the board connectors from a second side of the circuit boards.

3. The system of claim 2, wherein each of the electrical conductors of the board connectors includes at least one pin configured to be disposed in an aperture in a respective circuit board such that the electrical conductors of the board connectors can be soldered to their respective circuit boards using an automated soldering process.

4. The system of claim 3, wherein each of the electrical conductors of the board connectors includes a blade terminal sized to not extend out of an open end of a corresponding board connector, each of the electrical conductors of the interconnector including a respective female terminal disposed within the housing of the interconnector and configured to connect to a corresponding blade terminal, the housing of the interconnector including two ends, each sized to fit into an open end of a respective board connector to facilitate the electrical connections between the blade terminals and the female terminals.

5. The system of claim 1, wherein each of the electrical conductors of the board connectors includes a blade terminal, and the each of the electrical conductors of the interconnector includes a respective female terminal configured to connect to a corresponding blade terminal, each of the female terminals including a respective set of terminal legs and a corresponding clamp member arranged to apply a compressive force on the terminal legs to secure a respective blade terminal therebetween.

6. A system for electrically connecting circuit boards, comprising:
a first board connector configured to be soldered to a first circuit board using an automated soldering process and including a first housing and a plurality of electrical terminals disposed at least partially within the first housing having an open end;
a second board connector configured to be soldered to a second circuit board using an automated soldering process and including a second housing and a plurality of electrical terminals disposed at least partially within the second housing having an open end; and
an interconnector including a plurality of interconnector electrical terminals configured to electrically connect corresponding electrical terminals of the first and second board connectors with a non-soldered connection to electrically connect the first and second circuit boards, and wherein the open ends of the first and second housings are configured to be disposed proximate corresponding apertures in the first and second circuit boards such that respective portions of the interconnect extend through corresponding apertures in the first and second circuit boards when the interconnector electrical terminals are electrically connected to corresponding electrical terminals of the first and second board connectors.

7. The system of claim 6, wherein the interconnector further includes an interconnector housing at least partially enclosing the interconnector electrical terminals, the interconnector housing being configured to cooperate with the first and second housings to at least partially enclose the electrical connections between the electrical terminals of the first and second board connectors and the interconnector electrical terminals.

8. The system of claim 7, wherein the interconnector housing includes two open ends, the interconnector electric terminals being configured to slidably connect to the electrical terminals of the first and second board connectors such that the open ends of the interconnector housing and respective open ends of the first and second board connectors overlap when the interconnector electrical terminals are electrically connected to corresponding electrical terminals of the first and second board connectors.

9. The system of claim 8, wherein the open ends of the interconnector housing extend through corresponding apertures in the first and second circuit boards when the interconnector electrical terminals are electrically connected to corresponding electrical terminals of the first and second board connectors.

10. The system of claim 8, wherein one of the electrical terminals of the first and second board connectors or the interconnector electrical terminals are blade terminals, and the other of the electrical terminals of the first and second board connectors or the interconnector electrical terminals are female terminals configured to receive the blade terminals therein.

11. The system of claim 10, wherein each of the female terminals includes a respective set of terminal legs and a corresponding clamp member arranged to apply a compressive force on the terminal legs to secure a respective blade terminal therebetween.

12. The system of claim 7, wherein each of the board connectors is configured to be mounted to a respective top side of the first and second circuit boards, and the interconnector electrically connects the first and second board connectors from respective bottom sides of the circuit boards.

* * * * *

UNITED STATES PATENT AND TRADEMARK OFFICE
CERTIFICATE OF CORRECTION

| | | |
|---|---|---|
| PATENT NO. | : 8,419,441 B1 | Page 1 of 1 |
| APPLICATION NO. | : 13/301833 | |
| DATED | : April 16, 2013 | |
| INVENTOR(S) | : John Topolewski et al. | |

It is certified that error appears in the above-identified patent and that said Letters Patent is hereby corrected as shown below:

In the Claims:

Column 5, Line 61, Claim 1:

After "partially enclose" delete "the".

Column 5, Line 63, Claim 1:

After "interconnector and" insert -- the --.

Column 6, Line 39, Claim 6:

After "including a first housing" insert -- having an open end --.

Column 6, Line 40, Claim 6:

After "within the first housing" delete "having an open end".

Column 6, Line 44, Claim 6:

After "including a second housing" insert -- having an open end --.

Column 6, Line 45, Claim 6:

After "within the second housing" delete "having an open end".

Signed and Sealed this
Sixth Day of August, 2013

Teresa Stanek Rea
*Acting Director of the United States Patent and Trademark Office*